(No Model.) 2 Sheets—Sheet 1.
W. J. KENT.
MACHINE FOR MAKING HORSESHOE BARS.
No. 518,608. Patented Apr. 24, 1894.
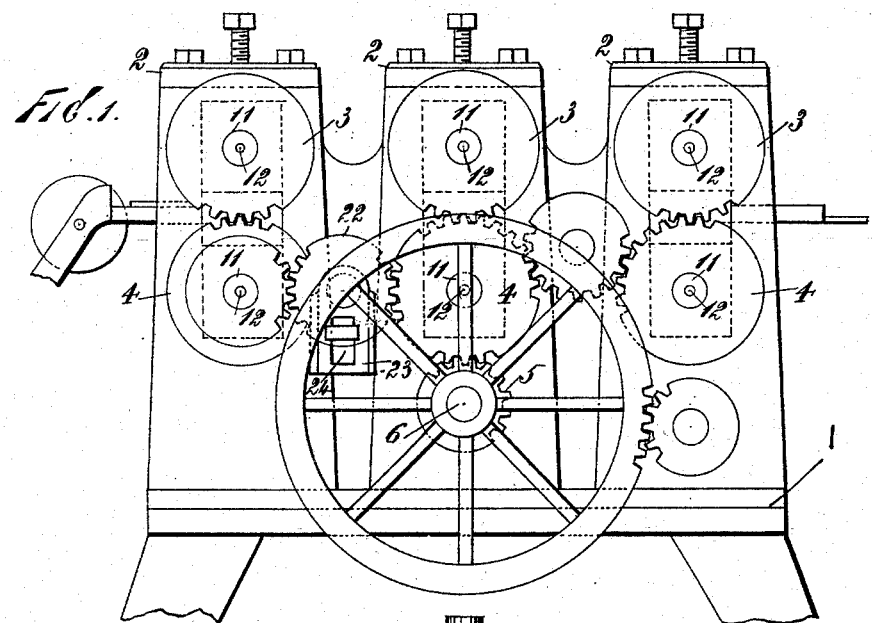
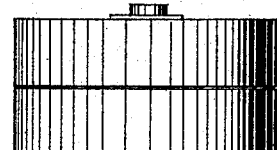
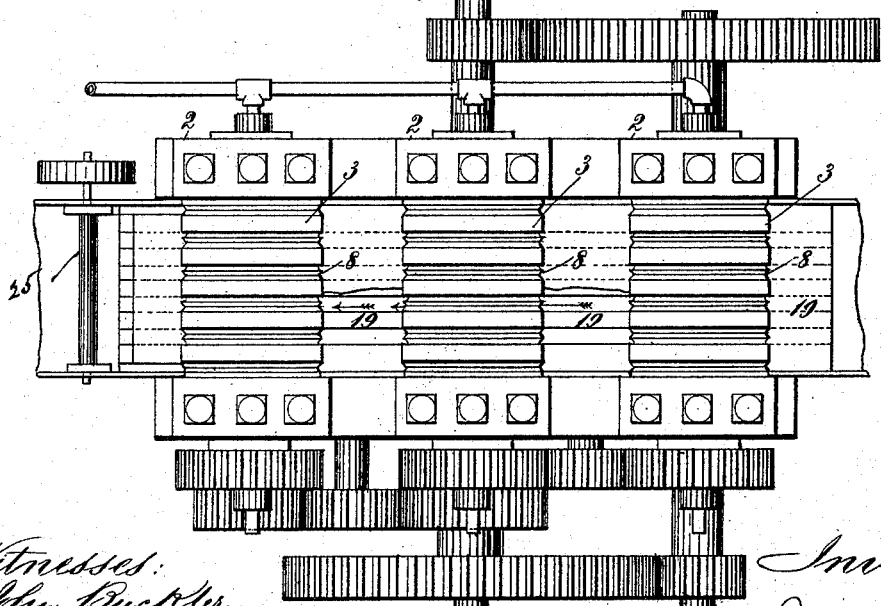
Witnesses:
John Buckler,
William P. Dougherty
Inventor:
William J. Kent
By Samuel Campbell
Attorney.

(No Model.) 2 Sheets—Sheet 2.
W. J. KENT.
MACHINE FOR MAKING HORSESHOE BARS.
No. 518,608. Patented Apr. 24, 1894.
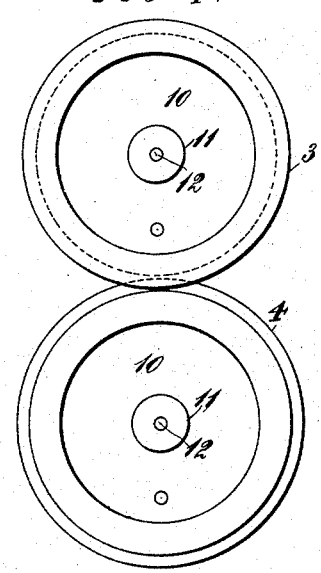
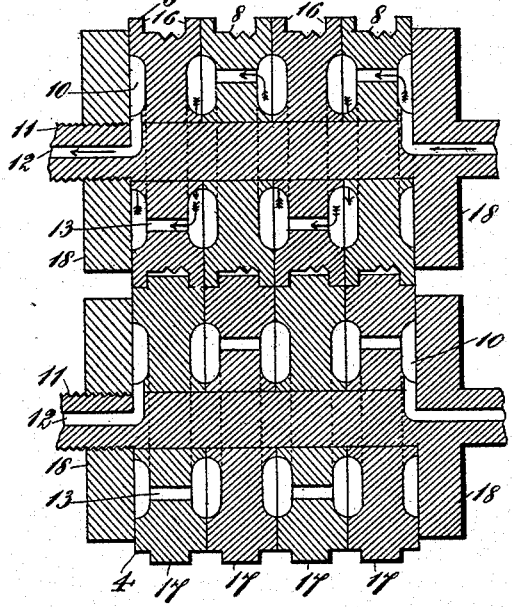
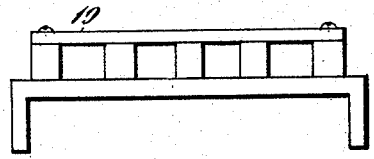
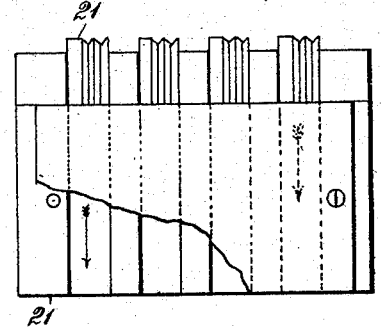
Witnesses:
John Buckler,
William P. Dougherty
Inventor
William J. Kent
By Samuel Campbell
Attorney

UNITED STATES PATENT OFFICE.

WILLIAM J. KENT, OF NEW YORK, N. Y.

MACHINE FOR MAKING HORSESHOE-BARS.

SPECIFICATION forming part of Letters Patent No. 518,608, dated April 24, 1894.

Application filed September 23, 1893. Serial No. 486,307. (No model.)

*To all whom it may concern:*

Be it known that I, WILLIAM J. KENT, a citizen of the United States, and a resident of the city, county, and State of New York, have invented certain new and useful Improvements in Machines for Forming Horseshoe-Blanks, of which the following is a specification.

This invention relates to machines for forming horseshoe plates or blanks of the class known to the trade as racing plates, which differ from ordinary horseshoes in that the essential requisites are lightness combined with strength, capability of affording a firm hold without calks, and a sufficiently broad inner surface to afford a support for the hoof, and to resist expansion of the same when the horse is in violent action. The approved form consists of a plate having a flat inner face to fit the hoof, and an outer face having two or more ridges formed longitudinally thereon, the outer ridge following substantially the outer edge of the shoe, and the other being of less height and lying about half way between the outer and inner edge of the plate.

The present invention consists in an improvement on the machine patented to me February 10, 1891, No. 446,066, and is a machine for forming the face of the plate into the shape above described in bars of any length.

The invention is illustrated in the accompanying drawings, in which—

Figure 1 is a side elevation of my improved machine; Fig. 2 a plan view; Fig. 3 a longitudinal section of the rollers; Fig. 4 an end elevation of the same; Figs. 5 and 6 details of the rake-off and guides.

Upon a suitable frame or bed (1) are mounted three pairs of standards (2). In bearings in each pair of standards are carried a pair of rollers (3 and 4) which are driven in unison by suitable gearing (5) and a driving shaft (6) or pulley, adapted to be connected with any convenient source of power. These sets of rollers are arranged to receive the metal in consecutive order, and are intended to bring the raw material into finished shape by gradual stages, the first set of rollers partially shaping it, the second set continuing the operation, and the third set completing it. In my former patent it took three consecutive operations to complete the shape or blank from the raw material, and on account of the cooling of the metal in lifting and re-inserting, only short pieces could be formed; which difficulty is by this my improved machine remedied. With the exception of the especial form of groove or pass in the rollers required for each successive stage of the operation, the rollers are precisely similar in form and construction, which is as follows:

In my improvement, the upper roller (3) of each set has its periphery formed with one, two, three or more grooves or passes, as at 8, conforming generally, in the case of the first two sets, and exactly in the third set, to the proposed form of the finished blank or "shape" namely, with two subordinate grooves to form the face of the shoe, and a convexed part to form the concave part of the blank from the inner ridge to the inner ridge of the blank. The lower roller (4) of each set is in effect a smooth cylinder, bearing closely against the circumference of the upper roller, though in practice, for especial reasons hereinafter stated, this form is modified. Each roller, moreover, consists of as many sections as there are passes, but are keyed upon the shaft and operate as a single roller. The separate roller sections as shown in Fig. 3, are each hollowed out upon their ends or plane faces, as shown at 10, and hence adjacent sections are in contact for only a short distance from their outer circumferences. An open space is thus formed between adjacent roller sections, the object of which is to hold a quantity of cold water for the purpose of keeping the rollers cool when operating upon heated metal. The water is introduced in the following way: In each shaft (11) upon which the roller sections are mounted is bored a hole, as at 12, emptying into space in rollers as shown in Fig. 3, and at one end is fitted with a swivel hose coupling, or equivalent device. Between the first pair of roller sections at one end of the shaft a small hole (13) is bored, thus affording communication between adjacent spaces, and these holes are preferably arranged alternately or on opposite sides of adjacent sections, or at an angular distance of ninety degrees from each other, in order to promote the greatest possible circulation of water. At the last section is a second opening into the shaft, and the water may be discharged in any suitable manner at the end of the shaft.

As before stated, the function of the lower roller is to act as a simple cylinder to press the metal into the passes or grooves of the upper. In practice, however, and as in my former patent, it is found that a simple cylinder does not perform the work perfectly for the reason that it leaves a fin upon the edge of the blank. To obviate this, I have in this my improvement, formed the shaping groove (8) before mentioned, at the bottom of a rectangular groove (16) of the width of the shaping groove, and have provided the lower roller, in each case, with a lip or flange (17) accurately fitting the rectangular portion of the groove upon the upper roller. The effect is precisely the same as with the plain cylinder, with the exception that the side walls of the groove prevent the spreading of the metal, and the flange (17) causes it to conform accurately to the shape of the groove, and thus absolutely prevents the formation of a fin upon the edge. A further advantage in making the rollers in sections arises from the fact that in case of breakage or wear of one section, that section can be readily removed and a new one substituted, the whole roller not being thereby disabled. The sections are held together by means of a collar (18) at one extremity of the shaft, and a screw-thread and nut at the other.

Channels or guides (19) are placed upon a table at the proper height in front of the first set of rollers, between the sets and behind the last set, to guide the blank or "shape" and prevent curling or twisting due to inequality of pressure upon the two sides of the blank. A rake-off (21) having teeth or projections to extend into the grooves and direct the blank or "shape" into the guides or channels, is attached directly upon and forms the top of the channels in front of each set of rollers. Behind the last set of rollers and immediately after the last guides is placed a take off roller No. 25 for the purpose of carrying off the manufactured stock and leaving the channels clear for the next bar.

On account of the decreased section and increased length of the metal after passing through the first two sets of rollers, it has been found necessary to vary the speed of the last set of rollers according to the particular class of work. This is accomplished by mounting the last intermediate pinion, as 22, upon a stud (23) in a slotted bracket (24) in such a manner that a change of pinions may be made after lowering or raising the stud to suit the required diameter of the pinion.

This machine is specially adapted for the working of aluminium into shapes for the aforesaid purpose on account of the peculiar qualities contained in this metal, it being passed through the rollers cold which gives it the required stiffness and wearing qualities required.

I claim as my invention—

1. As an improvement in rolling-mills for making horseshoe-bars, the combination with a series of pairs of rolls, of a closed guiding channel for the bar placed in front of the first pair of rolls, between each pair and behind the last pair, the top or cover of each of said guiding channels having teeth or projections extending into the pass between the rolls to act as a rake-off, and a take-off roller for carrying off the product of the rolling mill as it emerges from the last pass, substantially as described.

2. The improved rolling-mill herein described consisting in a pair or a series of pairs of rolls, each roll made in sections, keyed together upon a shaft, each section being hollowed out upon its face, thus forming an open space between adjacent sections, and each section having a hole through the hollowed out portion, the shafts upon which the sections are mounted being bored at each end and communicating with the hollowed out portion of each end section, thus forming a passage way for a cooling fluid as described.

3. The improved rolling-mill for forming horse-shoe bars, comprising a series of pairs of rolls geared together each pair consisting of a grooved and a tongued roll, an intermediate gear or pinion being mounted in a stud secured in a slotted bracket, whereby said pinion may be raised and lowered for the purpose described.

In testimony that I claim the foregoing as my invention I have signed my name, in presence of two witnesses, this 22d day of September, 1893.

WILLIAM J. KENT.

Witnesses:
ELMER G. SAMMIS,
WILLIAM P. DOUGHERTY.